United States Patent [19]
Gill et al.

[11] Patent Number: 4,557,422
[45] Date of Patent: Dec. 10, 1985

[54] FABRICATING LARGE, THICK WALL, TUBULAR STRUCTURES

[75] Inventors: Dee R. Gill, Sandy; Edward T. Hikida, Salt Lake City; Daniel M. Radice, Midvale, all of Utah

[73] Assignee: Hercules Incorporated, Wilmington, Del.

[21] Appl. No.: 520,670

[22] Filed: Aug. 5, 1983

Related U.S. Application Data

[62] Division of Ser. No. 337,803, Jan. 7, 1982, Pat. No. 4,470,860.

[51] Int. Cl.⁴ .............................................. B65H 75/24
[52] U.S. Cl. ...................................... 242/1; 242/72 R
[58] Field of Search .................... 242/1, 72 R, 110, 73; 156/425, 429, 494, 499

[56] References Cited

U.S. PATENT DOCUMENTS

| | | | |
|---|---|---|---|
| 2,808,097 | 10/1957 | Martin | 156/425 X |
| 3,231,442 | 1/1966 | Michael | 156/175 X |
| 3,379,591 | 4/1968 | Bradley | 156/425 X |
| 3,616,063 | 10/1971 | Bradley | 156/429 X |
| 3,700,512 | 10/1972 | Pearson et al. | 156/62.4 |
| 3,837,970 | 9/1974 | Medrano | 156/425 |
| 3,975,816 | 8/1976 | Carter | 156/425 X |
| 4,039,006 | 8/1977 | Inoue et al. | 156/173 X |

FOREIGN PATENT DOCUMENTS 54-28368  3/1979  Japan ................................. 156/173

Primary Examiner—Stuart S. Levy
Assistant Examiner—Joseph J. Hail, III
Attorney, Agent, or Firm—Edmund C. Ross, Jr.

[57] ABSTRACT

This invention relates to an improvement in filament winding large, hollow, tubular structures having significant axial reinforcement in their thick walls by means including (a) using a hollow, light weight mandrel adapted to expand radially at elevated temperatures and windings of alternate layers of filamentary materials positioned substantially axially and substantially circumferentially relative to the longitudinal axis of the mandrel wherein the alternate layers are preferably in a certain thermosettable resin matrix and wound in certain fashion and (b) heating the filament wound mandrel to cure the thermosettable resin wherein heat from inside and out of the mandrel controls the cure and expansion during the heating step. The thick walls preferably incorporate graphite fibers for significant strength in the reinforcement provided by the filamentary materials.

6 Claims, 5 Drawing Figures

FABRICATING LARGE, THICK WALL, TUBULAR STRUCTURES

This is a division of application Ser. No. 337,803, filed Jan. 7, 1982, now U.S. Pat. No. 4,470,860.

BACKGROUND OF THE INVENTION

1. Field of Invention

This invention relates to the art of filament winding as applied to highly reinforced, hollow tubular members of large size and to fabricating such bodies to have thick walls that are densely packed with filamentary materials in substantially void free and uniformly dispersed thermoset resin. This invention, more particularly, relates to an improved filament winding procedure that efficiently produces these structures to dimensionally precise specifications.

2. Prior Art

Filament winding is well known for producing shaped bodies having continuous filamentary materials as reinforcements thereof. Measures ordinarily undertaken with this technique, however, would appear inadequate for efficiently fabricating hollow, highly reinforced, large tubular structures of the type contemplated by this invention.

The structures of this invention have thick and dimensionally precise walls densely packed with filamentary materials in substantially void free and uniformly dispersed thermoset resin. Usual filament winding practice, for a number of reasons, might suggest that these structures should be prepared in a series of repeated winding and cure operations in order to preserve dimensional precision in their walls.

Thick walls of large, highly reinforced, tubular structures are prone to slumping or other distortions during the winding and cure operations. This tendency is more pronounced in these highly reinforced, large, tubular structures that are fabricated with significant axial reinforcement. Filamentary materials that are positioned relatively highly axially (i.e., positioned with respect to the center longitudinal axis of the structure at an angle of between about $\pm 5°$ and $\pm 15°$) to obtain this axial reinforcement cannot grasp preceding layers of fiber nearly as well as those that are positioned relatively more circumferentially. Large, highly reinforced tubular structures with such thick walls also take longer to fabricate. Slumping or other such distortions are generally time dependant; the longer time for fabrication, accordingly, provides for further aggravation thereof.

Still other considerations associated with the task of fabricating tubular structures of the aforementioned character include providing a relatively uniformly dispersed and substantially void free thermoset resin matrix for the densely packed filamentary materials. Certain resins, for example, may migrate in the thick walls prior to, and during curing, causing resin rich and resin poor areas in the structure. Moreover, a very large volume of filamentary materials is required to be wound within relatively short periods of time in producing large structures. Still further, large tubular structures of dimensional precision require mandrels with significant axial strength for dimensional stability.

OBJECTS OF THE INVENTION

It is an object of this invention to provide an improvement in filament winding for making highly reinforced, large tubular structures having thick walls densely packed with filamentary materials in substantially void free and uniformly dispersed thermoset resin.

It is an object of this invention to provide such an improvement in which there is greater efficiency in fabricating these structures than heretofore available in the prior art.

It is an object of this invention to provide such an improvement in which the thick walls of these tubular structures have exemplary dimensional precision.

These and other objects have been accomplished by filament winding practice in accordance with this invention as will be apparent from the following disclosure.

BRIEF DESCRIPTION OF THE INVENTION

This invention is directed to fabricating large, highly reinforced, hollow tubular structures. The tubular structures have thick, dimensionally precise walls with filamentary materials densely packed in thermoset resin. The thermoset resin is substantially void free and uniformly dispersed.

The fabrication comprises winding the filamentary materials about a hollow, thin walled aluminum mandrel having a central longitudinal axis. The mandrel is capable of radial expansion by application of elevated temperatures thereto. The winding is performed so as to form a plurality of alternate layers. The alternate layers comprise windings that, relative to the central longitudinal axis of the mandrel are (a) substantially circumferential windings of filamentary materials and (b) substantially axial windings of filamentary materials. The substantially circumferential windings are at a large angle relative to the longitudinal axis of the mandrel, e.g. between about $\pm 80°$ to $\pm 90°$. The substantially axial windings are at a small angle to the longitudinal axis of the mandrel, e.g. between about $\pm 5°$ and $\pm 20°$. Each of the alternate layers is in a matrix of thermosettable resin.

After completion of the winding of filamentary materials, the filament wound mandrel is heated to a temperature and for a time sufficient to cure the thermosettable resin. The heating raises the interior of the mandrel to a higher temperature than that of the exterior of the filament wound mandrel. The temperature difference between these interior and exterior locations is maintained preferably during substantially the entire heating step.

The resultant filament wound structure is then cooled at a rate such that stresses in the structure resulting from contraction during cooling are minimized; thereafter, the cooled structure is taken from the mandrel.

Aspects in preferred practice of the invention include (a) use of filamentary graphite materials for exceptional strength in reinforcement of the structures; (b) use of gelling epoxy resin compositions in radially outer portions of the alternate layers; and (c) circumferentially binding the substantially axial windings temporarily. Also, in present practice, radially inner portions of the alternate layers incorporate non-gelling epoxy resin compositions. In other more preferred practices, (d) the axial windings are grouped in pairs of plies in which the small angle of windings in a first ply is the negative of that of the second, and (e) each of the pair of plies is temporarily bound circumferentially with a highly tensioned belt or tape that is unbound therefrom as the subsequent substantially circumferential windings of filamentary materials progresses and forms the next layer and (f) the heating stage utilizes a shaft having banks of heaters radially disposed about the shaft within the mandrel.

DETAILED DESCRIPTION OF THE INVENTION

Tubular structures that are made in accordance with this invention include those between about 7 to 15 meters long, 1 to 3 meters in diameter and 2 to 6 centimeters in wall thickness and can be made even larger. The tubular structures have reinforcements by filamentary materials, such as carbon or graphite fibers, in a matrix of thermoset resin having a void content of about 6.5% by weight or less. These filaments are primarily positioned relatively axially and relatively circumferentially relative to a center longitudinal axis in each of the structures.

Figure 1:
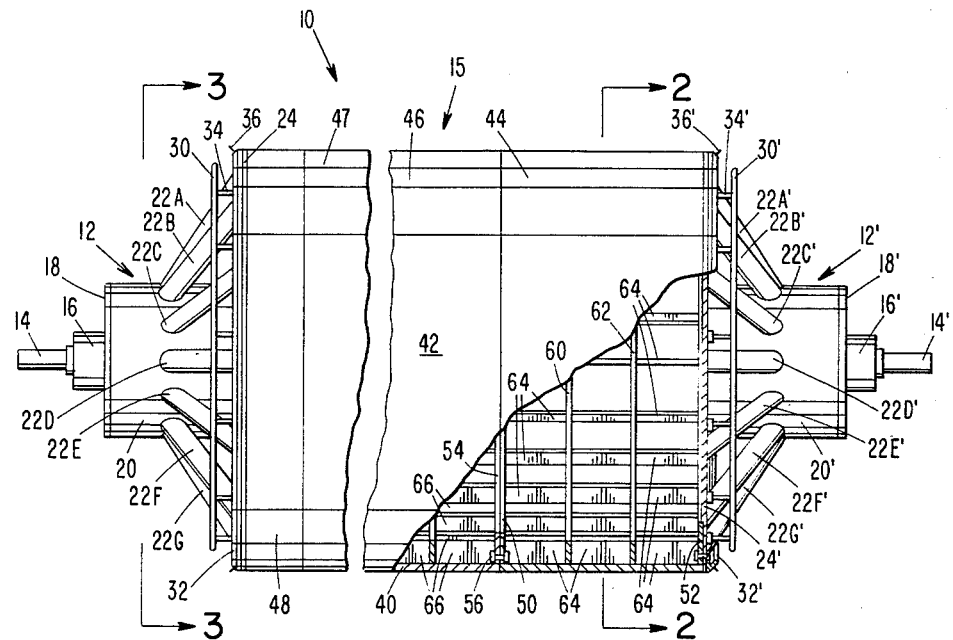
FIG. 1 is a side elevational view of the mandrel of this invention partly broken away through its cylindrical section showing the interior thereof.

FIG. 1 depicts light weight, hollow mandrel 10 which can be made of aluminum and has been used in fabricating several of the structures of this invention. FIG. 1 is a side elevational view of mandrel 10, broken between its left and right ends 12,12' through its partially cutaway cylindrical center section 15. Left and right ends 12,12' have symmetry; they are hereinafter described together with right end elements denominated as the primes (') of those of the left.

Mandrel 10 is supported in a conventional filament winding apparatus. Arbors 14,14' of the filament winding apparatus are shown in FIG. 1 axially extending from the left and right ends 12,12' of mandrel 10, respectively.

Arbors 14, 14' bolt or otherwise are affixed to adapters 16,16', respectively, of mandrel 10. Adapters 16,16' bolt around their peripheries to respective left and right perforated disk end plates 18,18' which are perforated to receive chucking from the aforementioned filament winding apparatus. Perforated disk end plates 18,18' bolt, in turn, to left and right hubs 20,20' which are hollow.

Figure 3:
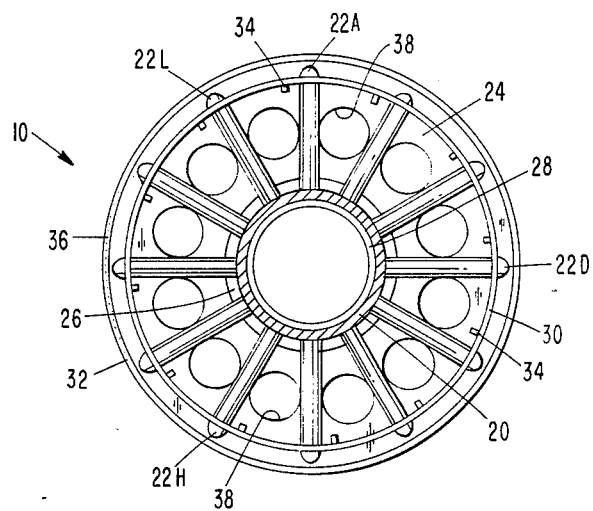
FIG. 3 is a section of the mandrel taken at 3—3 of FIG. 1.
Figure 4:
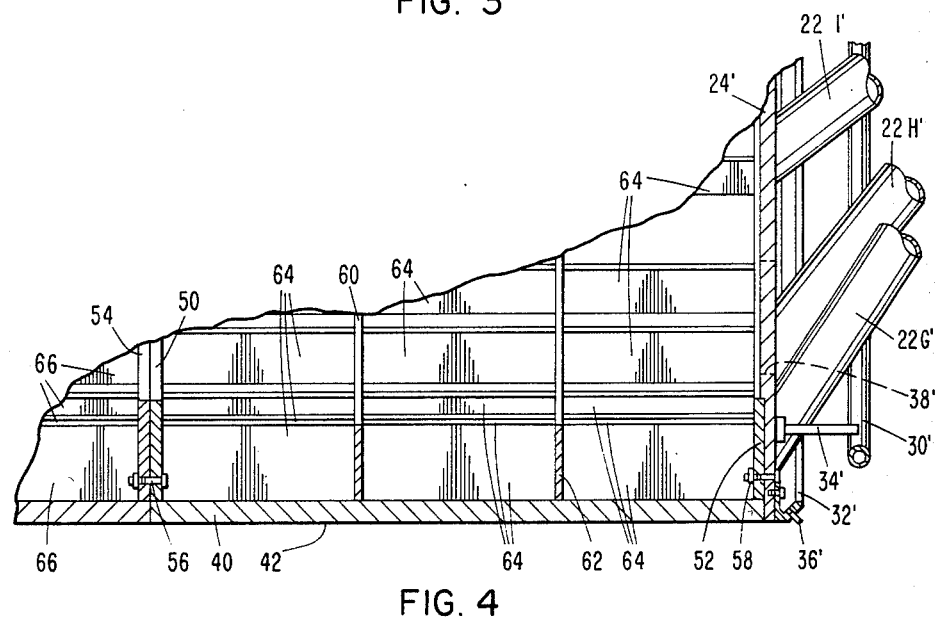
FIG. 4 is a partial side elevation of the mandrel, partly in section illustrating the interior thereof as in FIG. 1.

Hubs 20,20' carry spokes 22A through 22L, 22A' through 22L'. Spokes 22A through 22G are shown in FIG. 1 and these as well as 22H through 22L, are shown in FIG. 3. Spokes 22A' through 22G' appear in FIG. 1 and 22G', 22H' and 22I' are seen in FIG. 4, 22J' through 22L' not shown in the drawings. Spokes 22A through 22L, 22A' through 22L', respectively, extend rigidly between the circumference of left and right hubs 20,20' to the periphery of left and right perforated plates 24,24'.

Figure 2:
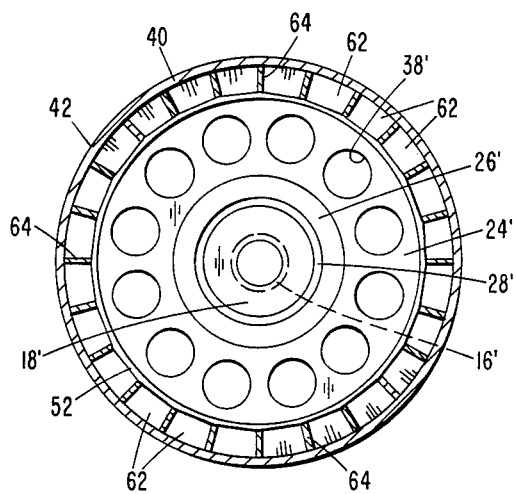
FIG. 2 is a section of the mandrel taken at 2—2 of FIG. 1.

As shown in FIG. 2, annular rings 26,26' fixedly mount respectively around left and right hubs 20,20' and to left and right perforated plates 24,24'. Within respective left and right hubs 20,20' are welded ring flanges 28,28'. Ring flanges 28,28' are positioned within left and right hubs 20,20' under spokes 22A through 22L, 22A' through 22L'. Ring flanges 28,28' serve in mounting a hollow metal tube or shaft that extends axially through the interior of mandrel 10 during cure operations and carries radiant heater banks for temperature control during these operations, as fully discussed hereinafter.

Left and right perforated plates 24,24' carry left and right roll bars 30,30' and circular pin rings 32,32'. Roll bars 30,30' mount to perforated plates 24,24' through left and right brackets 34,34'. Pin rings 32,32' bolt about the outer periphery of plates 24,24'.

Pin rings 32,32' carry left and right pin distributions 36,36' fixedly about their peripheries. There are about 900 of these pins distributed in a circle around each pin ring 32,32'. Pin distributions 36,36' cooperate with their adjacent roll bars 30,30' and one another in connection with winding the relatively axially disposed filamentary materials about mandrel 10. During winding operations, the axial windings of filamentary materials are positioned along cylindrical section 15 by repeatedly looping tows of the filaments around ends 12,12' of mandrel 10. The ends of the loops are held by the pin ring distributions 36,36'. The tows of the axial windings are positioned at an angle of between about ±5° and ±25° relative to the center longitudinal axis of mandrel 10 and are layed adjacent one another.

Left and right end plates 24,24' also have holes 38,38'. Holes 38,38' serve to lighten mandrel 10 as well as provide for its ventilation during cure operations.

Cylindrical section 15 has thin wall 40 (between about 4 and 5 centimeters thick) with outer winding surface 42. Winding surface 42 is coated with teflon or the like release material.

Cylindrical section 15 is composed of a plurality of open ended, cylindrical sections that are fastened together at their ends, of which sections 44, 46, 47 and 48 are shown at least in part in FIG. 1. These cylindrical sections may be of any convenient axial dimension; most of the sections of mandrel 10 are about 3.2 meters long.

Cylindrical section 44 has flanges 50,52 which project inwardly from wall 40 circumferentially about respective left and right ends of cylindrical section 44. As seen better in FIG. 4, flange 50 is bolted to inwardly projecting flange 54 of cylindrical section 46. Although only bolt 56 is depicted in FIGS. 1 and 4, cylindrical sections 44 and 46 actually bolt about forty times or more to one another about flanges 50 and 54. Similarly, flange 52 of section 44 is bolted to the periphery of perforated end plate 24', one of which bolts is shown as 58. These bolts also fasten to pin ring 32' and end plate 24'.

Flanges 50, 54 form a circumferential rib for strengthening mandrel 10 internally within wall 40. The other flange of section 46 together with another flange of the adjacent cylindrical section (both flanges not shown) similarly bolt together and form another circumferential rib. Still other cylindrical sections similarly bolt together and provide like circumferential ribs spaced axially from one another along cylindrical section 15 within wall 40.

Between flanges 50,52 axially along cylindrical section 44 are spaced circumferential ribs 60,62 (see also FIG. 2) which provide further strengthening for the portion of thin wall 40 between flanges 50,52. Other similarly disposed circumferential ribs in cylindrical sections 46,48 and others similarly strengthen wall 40 of cylindrical section 15.

Spaced longitudinal ribs 64 of cylindrical section 44 extend axially between circumferential ribs 50,52 and intersect ribs 60 and 62. Longitudinal ribs 64 (all 24 depicted in FIG. 2) are welded to the inner side of wall 40 and provide axial reinforcement of cylindrical section 44. Other longitudinal ribs 66 of section 46, shown in part in FIGS. 1 and 4, align with longitudinal ribs 64. Ribs 66 and others within cylindrical section 15 of mandrel 10 align with ribs 64 to provide continuous axial reinforcements spaced circumferentially about the inside of wall 40 axially along mandrel 10.

Figure 5:
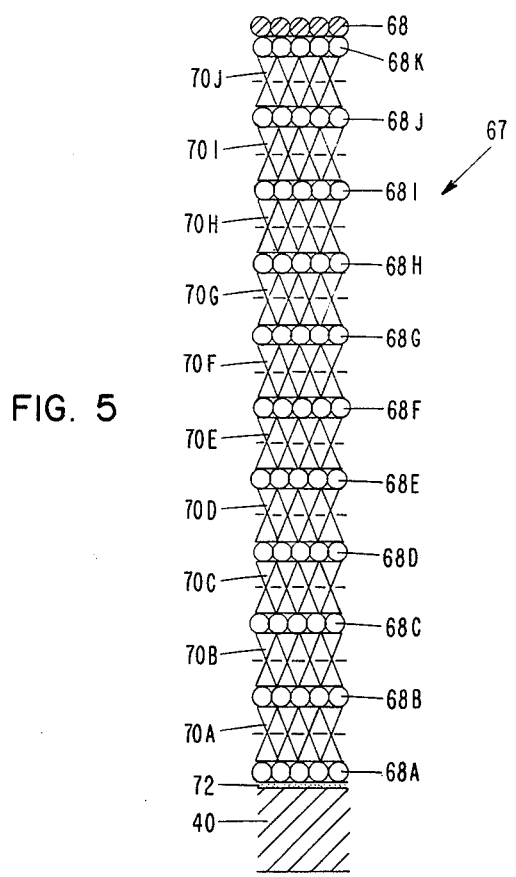
FIG. 5 illustrates diagrammatically a cross section of the wall of a tubular structure made in accordance with this invention.

FIG. 5 depicts diagramatically a partial cross section of the wall 67 of a filament wound mandrel made in accordance with this invention. The cross section is taken along the center longitudinal axis of mandrel 10 and includes a section of wall 40 thereof.

Each of level layers 68A through 68K of the cross section depicts a ply of continuous filamentary graphite materials that has been wound relatively circumferentially (about 85°–90° to the center longitudinal axis of mandrel 10) about mandrel 10. Each ply has about 14 tows/inch. Each tow has about 12000 graphite filaments in an untwisted bundle and an area of between about 6 and $9 \times 10^{-4}$ inches. Level layers 68A–68C each provide a maximum thickness change in wall section 67 of about 0.027 inches after their respective winding around mandrel 10. Level layers 68D–68K each provide a thickness change of about 0.024 inches after their respective winding around mandrel 10.

Each of helical layers 70A through 70J depicts a pair of plies of filamentary graphite materials that has been wound relatively highly axially (about ±10° to the center longitudinal axis of mandrel 10) about mandrel 10. Each of the plies has about 46 tows per inch wherein the tow is defined above and is at an angle that is the negative of its partner. The thickness change in wall section 67 caused by winding each of helical layers 70A through 70C around mandrel 10 is a maximum of about 0.158 inches and about 0.130 inches for each of layers 78D–78J.

The thickness of wall section 67 totals about 3.2 centimeters. The outer diameter of the wall of the filament wound mandrel is about 101.4 inches after completion of the windings. The tension of the filamentary materials used in winding layers 68A through 68K is about 4 to 8 pounds force. The tension on the filamentary materials used in winding layers 70A through 70J is about 2 to 3 pounds force.

Layer 72 in FIG. 5 is a cloth layer made from graphite fiber or the like and has a thickness of about 0.035 inches The preferred cloth is epoxy resin impregnated cloth having a high strength modulus The resin content is between about 39% and 45% by weight with a fiber volume of between about 59% and 65%. The fiber weighs about 350–400 grams per square meter. The cloth may be a 5 or 8 harness weight and 11 by 11 or 21 by 21 with a 3000 or 6000 end weave.

Doubler sections (i.e., wall sections of thicker or thinner cross section) can be fabricated at the ends of the structures of this invention as desired and have, for example, several plies of both S2 glass fiber and graphite fiber that alternate with one another above layer 68K. Between doublers at the ends graphite prepreg tape 68 may be applied using 75 pounds force per 2 inch tape.

In a first practice in accordance with this invention, level layers 68A through 68C incorporate a relatively non-gelling epoxy winding resin that remains at relatively low viscosity until curing. The non-gelling epoxy winding resin comprises (a) 100 parts by weight epoxy resin polymers, (b) about 35–40 parts by weight of a diaminodiphenylsulfone and (c) about 2–10 parts by weight of a piperidine and boron trifluoride complex.

The epoxy resin polymers are preferably a combination of epoxy polymers in which one acts as a reactive diluent. The combination comprises (i) between about 70 and 90 parts by weight of a diglycidal ether of bisphenol A epoxy polymer; and (ii) between about 10 and 30 parts by weight of a 1,4-butanediol epoxy polymer which is a reactive diluent for (i).

The bisphenol A epoxy polymer (i) has an epoxy equivalent weight between about 180–190 grams and a viscosity of between about 70–100 cp at 25° C. The reactive diluent has an epoxy equivalent weight of between about 125 and 150 grams, a viscosity of between about 10 and 25 cp at 25° C. and a specific gravity of between about 1.09 and 1.11 at 25/25° C. The epoxy resin polymer combination (i.e. (i) and (ii) together) has a viscosity between about 700 and 900 cp at 25° C., an epoxy equivalent weight of between about 167 and 176 grams and a specific gravity of between about 1.13 and 1.15 at 25/25° C. The epoxy resin polymers (i.e. (i) and (ii) combined) is available as EPON 826/EPI RE 25022 from Dexter Corp., Pittsburgh, CA. The diaminodiphenylsulfone is preferably 4,4' diaminodiphenylsulfone (DAPS) having a melting point between about 170 and 180° C. available, for example, as Eporal from Ciba-Geigy, Ardsley, N.Y. The piperidine complex of boron trifluoride is in the tan, solid form having a final melting temperature of between about 70°–75° C. available, for example, from Harshaw Chemical, Cleveland OH as BF$_3$-PIP.

The non-gelling epoxy winding resin has a viscosity between about 500 cp and 7500 cp at 25° C., a gel time at 150° C. of between about 15–30 minutes, a working life at 38° C. of at least about 12 hours and a density of between about 9 and 11 lb./gal. The non-gelling epoxy winding resin has a designation of MX-16 Epoxy Resin System by Hercules Incorporated, Magna, Utah.

Level layers 68D through 68K and helical layers 70D through 70J in the earlier mentioned first practice incorporate a gelling epoxy winding resin that gels below about 40° C. The gelling epoxy resin has 125 parts by weight of the epoxy polymers as described above in (a) of the non-gelling epoxy winding resin with about 25–35 parts weight of an amine blend curing agent. The amine blend curing agent has between about 35 and 45 parts by weight m-phenylenediamine (MPDA), between about 30 and 40 parts by weight p,p'-methylenedianiline (4,4 MDA), and between about 5 and 10 parts by weight o,p-methylenedianiline (2,4' MDA) with a titratable nitrogen content between about 18 and 19% by weight and less than 0.4 percent water. The amine blend can be obtained as Tonox 6040 from Uniroyal Incorporated, Naugatuck, CT. The pot life of the gelling winding epoxy resin is about four hours. The curing agent is added to the resin with the former being at a temperature of between about 100 and 120° F. and the latter between about 60 and 100° F.

In other practices of this invention, layers 68A–68K and 70A–70J are all wound using the gelling epoxy winding resin.

The filamentary materials employed in level and helical layers 68A–68K and 70A–70J are preferably the filamentary graphite materials that have about 12000 filaments per tow, i.e, a bundle of continuous filaments that are not twisted. These filamentary materials can be obtained from Hercules Incorporated, Magna, Utah as AS-4 graphite fiber or AS-4W graphite fiber which is the AS-4 graphite fiber coated with an epoxy sizing agent (Hercules Type W). These graphite fibers are manufactured by exposing polyacrylonitrile (PAN) to highly elevated temperature and have a density of between about 0.0625 and 0.0660 lb/square inch, a size content of between about 0.6 and 1.2% by weight, and respective ultimate tensile strength and modulus of elasticity (expressed at 100% fiber volume) of at least about 385 psi and between about 32 and 35 million psi at 77° F. The weight per length of the fiber is between about 43 and $52 \times 10^{-6}$ lb/inch.

The non-gelling and gelling epoxy winding resins are respectively combined with the graphite or other such filamentary materials at about 36 and 44% by weight resin to about 56 and 64% by weight filamentary solids. The impregnated filamentary graphite materials for layers 68A–68K and 70A–70J weigh between about 0.437 and 0.475 grams per linear foot per tow in the former resin case and between about 0.444 and 0.467 grams per linear foot per tow in the latter resin case.

After each pair of plies of the helical layers 70A–70J is wound, it undergoes radial compression inwardly prior to application of the succeeding layer of the level layers 68A–68K. The radial compression can be with a highly tensioned sacrificial tape; or it can be with a continuous, highly tensioned belt.

If a sacrificial tape is employed, the tape can be in the form of a thin, two inch ribbon that is porous. The ribbon is circumferentially wrapped (relative to the center longitudinal axis of mandrel 10) under tension about mandrel 10 over each pair of the plies of helical layers 70A–70J. An example of such tape is the teflon coated woven glass tape marketed as 384-8/60, style 125 from Fluorglas Division, Oak Materials Group, Hoosick Falls, N.Y.

The sacrificial tape is wound about mandrel 10 over each pair of plies at a minimum of about 90 pounds force tension per inch width of the tape; it is as overlapped approximately half its width. As a level layer of 68A–68K that is to be wound about the temporarily bound pair of plies is wound, portions (normally about 2 ribbon widths or about 3–4 inches) of the sacrificial tape, which portions are axially adjacent to the level layer portion being wound, are unwound. In a variant form, the tape is wound and unwound as the succeeding level layer is wound about the pair of plies of the helical layer. In this variation, the pair of plies of the helical layer has a wrapping of two or three ribbon widths (about 3 to 5 inches wide) of the tape wound about it at any one time.

A continuous belt apparatus or the like may be used as an alternative to the use of sacrificial tape. The belt apparatus employs a tensioned belt looped around a portion of the pair of plies, such as the pair of plies of helical layer 70A, that continually changes axially as mandrel 10 rotates. The portion in contact with the belt is radially compressed toward wall 40 of mandrel 10 first by the belt, and then by filamentary materials of the succeeding level layer as another, axially adjacent, portion of the pair of plies comes into contact with the belt. The belt contacts the pair of plies at an angle such that there is rotation of mandrel 10 and axial translation of the belt relative to the mandrel.

When using gelling or non-gelling epoxy winding resins as described above, the time for winding each of helical layers 70A through 70J ranges preferably up to about 24 hours from start to completion of compaction by the aforedescribed belt or tape for optimum usage of these resins. If the preceding layer is no longer tacky because of delay, however, such preceding layer can be refreshed by application of the appropriate resin.

After completion of winding level layers 68A–68K and helical layers 70A–70J about mandrel 10, the filament wound mandrel is placed in an oven. Generally, the temperatures and times employed in curing operations include temperatures in a range between about 200 and 400° F. and periods of between 10 and 15 hours when the aforedescribed epoxy winding resins are used. A typical cure schedule (using the above described graphite fiber and epoxy winding resins) is to (1) raise the temperature of the filament wound mandrel to between about 235° and 265° F. in two hours, (2) hold at about this temperature for about three hours, then (3) raise the temperature to between about 335° and 365° F. in about two and one half hours, (4) hold at this latter temperature for about three hours and (5) then cool to between about 135° and 165° F. at a rate not exceeding about 50° F. per hour. The temperature inside the mandrel is greater than that of the oven outside the mandrel during substantially the entire time of at least steps (1) and (2), by at least about 5° F., more preferably also during steps (3) and (4). The temperature of the filament wound part itself, however, is kept substantially uniform, preferably not varying more than about 10°–25° F. from location to location and more preferably less. Use of a same cure schedule from filament wound mandrel to filament wound mandrel provides for structures with reproducable dimensions.

When the average temperature of the structure declines to between about 135° and 165° F. during cooling, the structure is removed from the oven and allowed to further cool by natural convection. While in the oven, mandrel 10 oscillates at a rate of up to about 3 rpm.

In curing operations of this invention, as mentioned, the temperatures inside mandrel 10 are greater by at least about 5° F. than the temperatures of the oven outside the filament wound mandrel at each curing stage. To this end, banks of radiant heaters are carried within mandrel 10 on a hollow, cylindrical metal tube or shaft of constant diameter extending between ends 12,12' through ring flanges 28,28'.

The metal tube or shaft is inserted after completion of the winding of the filamentary materials about mandrel 10. End cap 18 is unfastened and removed to allow mounting of the shaft within mandrel 10 along its center longitudinal axis. The shaft carries two or more heater banks between ends 12,12' of mandrel 10 within cylindrical section 15. Each heater bank comprises six radiant heaters that are mounted to and spaced around the exterior of the shaft. Each radiant heater extends longitudinally along the shaft in each bank coextensively with the others of that bank. Electrical wires for the heaters extend inside the shaft. The ends of the shaft mount through flanges 28,28 inside hubs 20,20'. The middle portion of the shaft is mounted to the inside of cylindrical section 15 by guides that attach to a circumferential rib in the interim of mandrel 10. Strategically located thermocouples (e.g. within mandrel 10 and within the alternate layers of windings) sense temperatures and heating elements of the radiant heaters are controlled in response thereto.

After the structure has cured in accordance with a schedule such as aforementioned and is at room temperature, it is slid from the mandrel axially. One of pin rings 32,32' is unfastened and removed from mandrel 10 as is the roll bar 12 or 12' adjacent thereto. The end of mandrel 10 with pin ring and roll bar removed is fixed and the other end supported under the cured structure. Hydraulic rams are spaced about the structure against the end of its wall at the fixed end of mandrel 10 and push the structure off mandrel 10 while it is supported by an air palet at the other.

Present and prospective specific applications for the tubular structures made in accordance with practices of this invention include canisters for strategic missiles and fuel confinement vessels for space vehicles.

This invention has been described by relatively detailed reference to a specific practice thereof. It is to be understood that these details of the disclosure are not meant as a limitation of the scope of this invention, but, rather as means for enabling its broader usage. Other particulars useful in its practice will be recognized by those familiar with the art of filament winding.

Accordingly, what is claimed is:

1. A mandrel for filament winding a large tubular structure, said mandrel having a horizontal central mandrel axis about which said mandrel rotates while receiving filaments that form said tubular structure, said mandrel comprising:

a hollow, cylindrical mandrel body, said mandrel body having (i) a longitudinal axis coincident with said mandrel axis, (ii) an outer cylindrical winding surface adapted for laying of said filaments and (iii) an inner mandrel body surface adapted to rigidifying and strengthening said mandrel;

first and second hub structures located at the respective ends of said mandrel body, said hub structures adapted to accept means for rotating said mandrel about said mandrel axis, said hub structures attached solely to the respective ends of said mandrel and said means for rotating attached solely to said hub structure;

said mandrel body comprising a plurality of similarly configured, annular mandrel segments fastened together along said central axis to form said mandrel body, said mandrel segments being cylindrical in form and having the same diameter as said mandrel body;

each of said mandrel segments having an inner segment surface which (i) forms said inner mandrel body surface together with inner segment surfaces of the remaining mandrel segments and (ii) bears (a) first and second fastenable ribs depending radially inward from said inner segment surface circumferentially around respective opposite ends of said mandrel segment each said fastenable rib adapted to fasten to an adjacent fastenable rib of another said mandrel segment that is adjacent said first or second fastenable rib in said mandrel body, (b) an intermediate rib depending radially inward from said inner segment surface circumferentially around a middle portion of said inner surface between said opposite ends and (c) a plurality of long rib segments extending between said first and second fastenable ribs through said radial rib, said long rib segments being spaced circumferentially around said mandrel surface and in alignment with other long rib segments of other of said mandrel segments so as to form mandrel ribs respectively extending parallel to said mandrel axis along said inner mandrel body surface said mandrel having two roll bars extending circumferentially about the horizontal central mandrel axis and spaced from the mandrel body one adjacent each of the respective ends of said mandrel body.

2. The mandrel in accordance with 1 wherein said annular mandrel segments bolt to each other around said fastenable ribs.

3. The mandrel in accordance with claim 2, wherein said mandrel segments comprise aluminum.

4. The mandrel in accordance with claim 3, which has a pin ring at each end around said hub structures, each said pin ring having a diameter similar to that of said mandrel body and comprising a plurality of pins extending outward away from said mandrel body.

5. A mandrel for filament winding a large tubular structure, said mandrel having a horizontal central mandrel axis about which said mandrel rotates while receiving filaments that form said tubular structure, said mandrel comprising:

a hollow, cylindrical mandrel body, said mandrel body having (i) a longitudinal axis coincident with said mandrel axis, (ii) an outer cylindrical winding surface adapted for laying of said filaments and (iii) an inner mandrel body surface adapted for rigidifying and strengthening said mandrel;

first and second hub structures located at the respective ends of said mandrel body, said hub structures adapted to accept means for rotating said mandrel about said mandrel axis, said hub structures attached solely to the respective ends of said mandrel and said means for rotating attached solely to said hub structure;

said mandrel body comprising a plurality of similarly configured, annular mandrel segments fastened together along said central axis to form said mandrel body, said mandrel segments being cylindrical in form and having the same diameter as said mandrel body;

each of said mandrel segments having an inner segment surface which (i) forms said inner mandrel body surface together with inner segment surfaces of the remaining mandrel segments and (ii) bears (a) first and second fastenable ribs depending radially inward from said inner segment surface circumferentially around respective opposite ends of said mandrel segment each said fastenable rib adapted to fasten to an adjacent fastenable rib of another said mandrel segment that is adjacent said first or second fastenable rib in said mandrel body, (b) an intermediate rib depending radially inward from said inner segment surface circumferentially around a middle portion of said inner surface between said opposite ends and (c) a plurality of long rib segments extending between said first and second fastenable ribs through said radial rib, said long rib segments being spaced circumferentially around said mandrel surfaee and in alignment with other long rib segments of other of said mandrel segments so as to form mandrel ribs respectively extending parallel to said mandrel axis along said inner mandrel body surface, wherein a portion of said first hub structure is removable for inserting a metal tube along said mandrel axis, said metal tube being adapted to carry radiant heaters, wherein said first hub structure has a circumferential rib for carrying said metal tube.

6. The mandrel in accordance with claim 5, wherein said hub structures each comprise a center hub having spokes radiating therefrom to said mandrel body.

* * * * *

UNITED STATES PATENT AND TRADEMARK OFFICE
CERTIFICATE OF CORRECTION

PATENT NO. : 4,557,422
DATED : December 10, 1985
INVENTOR(S) : D. R. Gill, E. T. Hikida & D. M. Radice It is certified that error appears in the above-identified patent and that said Letters Patent are hereby corrected as shown below:

Column 10, Line 54 of Claim 5;

"surfaee" should read --surface-- .

Signed and Sealed this

Fourth Day of March 1986

[SEAL]

Attest:

DONALD J. QUIGG

Attesting Officer   Commissioner of Patents and Trademarks